UNITED STATES PATENT OFFICE.

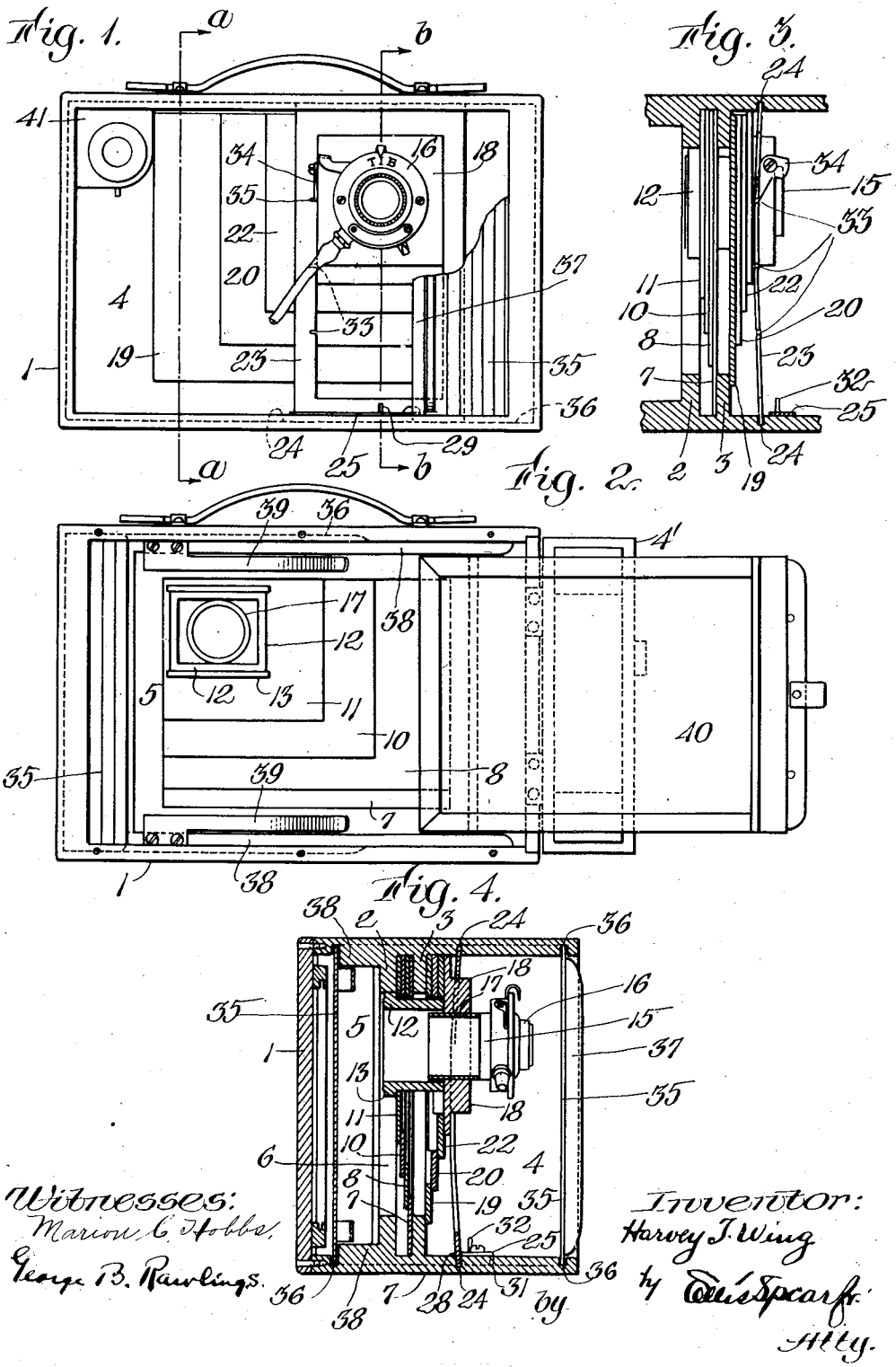

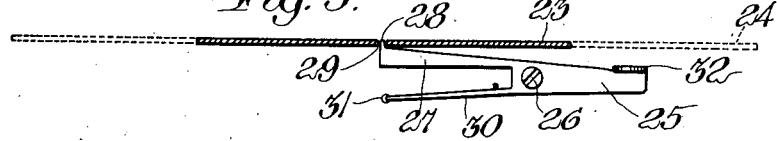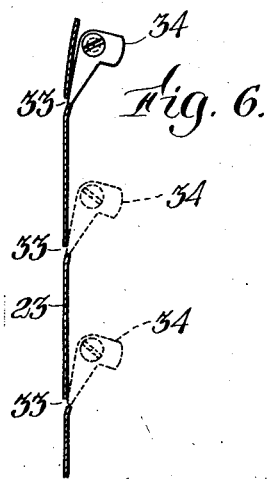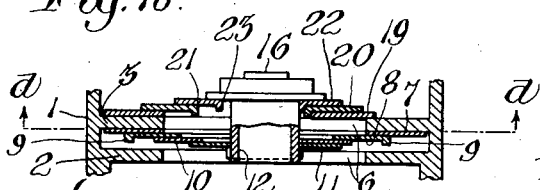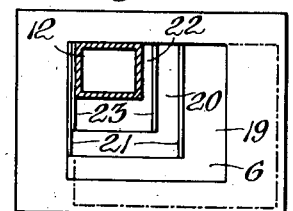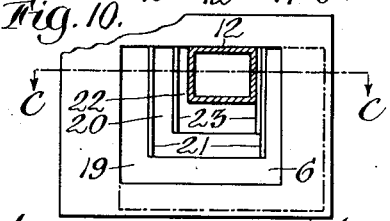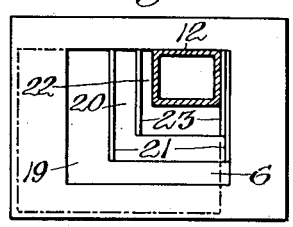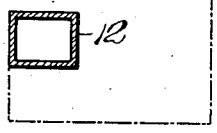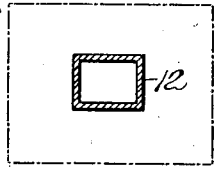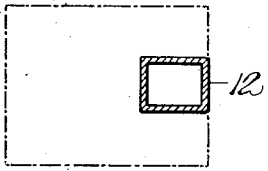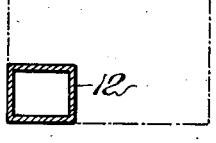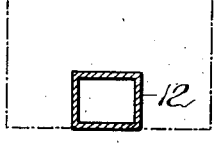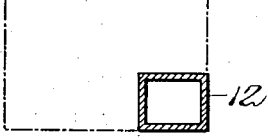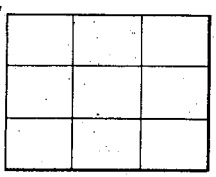

HARVEY T. WING, OF REVERE, MASSACHUSETTS.

CAMERA.

1,084,687.   Specification of Letters Patent.   Patented Jan. 20, 1914.

Application filed March 10, 1913. Serial No. 753,195.

*To all whom it may concern:*

Be it known that I, HARVEY T. WING, a citizen of the United States, residing at Revere, county of Suffolk, Commonwealth of Massachusetts, have invented certain new and useful Improvements in Cameras, of which the following is a specification.

This invention relates to cameras and particularly to a plural exposure plate camera.
In cameras of this class it is customary to make a number of exposures on a single plate which may be later developed and any or all of the individual exposures selectively enlarged from the negative. The advantages of a camera of this kind are numerous and so obvious that they scarcely need mention. While the principle upon which this type of camera is based is correct, yet in practical operation certain problems have presented themselves which must first be solved before its general adoption is assured. The principal difficulty noted has been that of accurately locating each individual exposure on the plate so that they will all be positioned properly with respect to each other and to the plate. This requires that the lens holder be capable of successive movements relative to the plate, which positions of movement must be properly and accurately determined before the exposure is made. A further difficulty has been noted in the front closure of the camera. The ordinary folding front will, in certain positions of the camera, tend to obscure, or partially hide the object so that no exposure or an incomplete exposure is had.

To the end, therefore, of overcoming these difficulties and improving and simplifying the construction of cameras of this class, I have devised my present invention.

In this camera I provide means for accurately positioning and effectively holding the lens relative to the portions of the plate to be exposed, and furthermore use a novel form of disappearing closure so that no obstruction will be presented to the several fields of vision.

The construction and principle of my invention will be more fully disclosed in the specification which follows and as illustrative of the same I have shown in the annexed drawings a camera which I have found well adapted for the purposes intended.
Throughout specification and drawings like numerals of reference will indicate corresponding parts and in these drawings:

Figure 1 is a front elevation of a camera in accordance with my invention, the sliding closure being partly broken away to disclose details of construction. Fig. 2 is a rear elevation thereof, the plate holder being partially removed to expose the interior construction. Figs. 3 and 4 are vertical sections on the lines $a$—$a$ and $b$—$b$, respectively, of Fig. 1, looking in the direction of the arrows. Figs. 5 and 6 are details of the locking means for controlling the relative horizontal and vertical position, respectively, of the lens. Figs. 7 to 15 inclusive are details illustrating various positions of the shiftable leaves or frames relative to the plate, Fig. 10 being taken on the line $d$—$d$ of Fig. 16. Fig. 16 is a transverse section on the line $c$—$c$ of Fig. 12, and Fig. 17 is a diagrammatic view showing the manner in which the plate is subdivided into individual exposure spaces.

The camera thus illustrated comprises a camera box, 1 divided by a pair of spaced partitions 2 and 3 into a front lens receiving chamber 4 and a rear plate receiving chamber 5. These partitions each have a rectangular opening 6 therein, said openings being co-extensive with each other. Fitted in the space separating said partitions is a plurality of inner open rectangular sliding leaves arranged in superimposed relation from the rear partition 2 to the front partition 3. The largest of these leaves 7 bears against the rear face of the front partition and has a focal opening therein substantially co-extensive with the openings 6 of the partitions. This leaf is capable of a slight vertical movement, but has no horizontal play and may therefore be regarded as fixed. Slidable vertically and horizontally on this leaf is a second leaf 8, slightly smaller in area and with a proportionately smaller focal opening therein. This leaf is formed at each end with a rib 9 raised from its outer face, the purpose of which is to limit the horizontal movement of the leaf 10 placed upon it, similar in shape to said leaf 8, but of smaller area and therefore having a proportionately smaller focal opening. The rearmost or upper leaf 11 is slidable relative to this leaf 10 and is the smallest in area and focal opening of all of the leaves.

Inserted through the focal openings of these leaves from the rear to the front is a lens holder socket piece 12, having on two sides thereof, ribs 13 adapted to abut against the walls of the opening in the leaf 11 to hold the socket piece in place.

The cylindrical extension piece 15 of a lens holder 16 is inserted into the socket piece 12 from the front of the camera, through the thimble 17 of a socket and guide plate 18, which is fastened to the socket piece 12 so that said socket piece will move with the movement of piece 18.

The lens holder is adjusted to its relative positions of focus by means of a plurality of outer superimposed leaves or frames capable of vertical and horizontal movement relative to each other. These leaves are similar to the leaves already described, each being of relatively smaller area than the one upon which it rests and with its focal opening of proportionately smaller size. The rearmost and largest of this outer series of leaves is indicated by the numeral 19 and abuts against the front face of the partition 3. The intermediate leaf is indicated by the numeral 20 and has the end walls of its opening formed with rearwardly faced ribs 21 to limit the horizontal movement of the superimposed leaf 22 relative thereto. This leaf 22 is similarly provided with ribs 23 adapted for contact with the ribs 21.

It is here desirable to call attention to the overlapping of the two sets of leaves to cover their respective focal openings. This is best shown in Fig. 4 and its purpose is to effectively cover that portion of the plate not to be exposed at the time the picture is being taken.

To hold all the leaves accurately in adjusted position relative to each other and to that portion of the plate which is to be exposed to the light, I provide a locking device in the form of an open spring metal frame 23, of substantially the width of the opening in the intermediate leaf 20. This locking frame is slidable in grooves 24 in the top and bottom walls of the camera box, and its relative horizontal movement is controlled by a locking lever 25, pivoted at 26 to the bottom wall of the box. This lever is bifurcated to provide a lever arm 27 having a locking finger 28 adapted for engagement with a notch 29 cut in the center of the bottom strip of the locking frame. When locked in this manner, the frame is in its intermediate operative position. The other arm 30 of the locking lever has a downturned point 31, adapted for engagement in a hole in the base of the camera box. This hole and point serve to lock the lever against lateral displacement when in operative position. At the other end of the lever a teat 32 is struck up therefrom to provide a finger grip whereby the lever may be rocked on its pivot. Three positions of relative horizontal adjustment are thus provided by the single notch in the locking frame, which positions are indicated in Figs. 9, 12 and 15, Figs. 9 and 15 representing the extreme positions of adjustment, in which positions the locking finger engages the edge of one or the other of the side strips of the frame, and Fig. 12 representing the intermediate position in which the locking finger is engaging the locking notch in the bottom strip of the frame.

To control the relative vertical adjustments of the slidable leaves, one side of the strip of the locking frame has notches at three equi-distant points, corresponding in their degree of separation to the relative sizes of the exposures to be made on the plate. These locking notches are indicated by the numeral 33 and are adapted to be selectively engaged by a locking pawl 34, pivoted to the socket plate 18 to lock the lens in any of its positions of vertical adjustment, which positions are indicated in Figs. 7, 8, 10, 11, 13 and 14.

From the foregoing it will be noted that the camera is capable of making nine exposures on a single plate as indicated in Fig. 17, and that the lens can be accurately adjusted and effectively locked in any desired position to expose a given area of the plate. The invention however, is not limited to this or any number of exposures nor to the positions of adjustment shown and described, as these are merely illustrative of the application of its principles.

In a camera of this kind it is moreover necessary that no obstruction shall be offered to the focal field of the lens. In some positions of use, the ordinary folding front would tend to partially if not entirely obscure the full field to be focused. I have therefore provided a flexible disappearing closure 35 which slides in grooves 36, across the front face of the camera, around an end wall, and into the plate holding chamber 5. This closure is provided with an exterior rib 37 which affords a grasping portion for the fingers.

The partition 2 is formed with lateral extensions 38 to which are secured blade springs 39 which frictionally engage a plate holder 40, adapted to be inserted within said chamber through the opening in the end wall of the camera, a closure 4' hinged to the camera wall closing said opening.

I have indicated at 41 a finder which may be of any desired construction.

In use, a plate is inserted in the plate holder and the lens is moved by hand to that portion of the plate which it is desired to expose, the sets of leaves moving with the movement of the socket plate 18. When the lens is in position, which position can be gaged by the notches on the locking frame, the leaves and lens are locked in their respective adjusted positions. The object to be photographed having been located in the finder, the exposure is made and the lens may then be moved to another portion of the plate and another exposure be made. The focus of the lens may be determined by moving the lens toward and away from the socket plate 18. When nine exposures or any number less than nine have been made on the plate, the plate may be removed and a fresh one substituted.

Various modifications coming within the spirit and scope of my invention may obviously be resorted to, if within the limits of the appended claims.

What I, therefore, claim and desire to secure by Letters Patent is:

1. In a camera of the class described a supporting device for a sensitized medium, and a series of members relatively movable in two directions and arranged in superimposed relation and of gradually increasing area from the uppermost to the lowermost and having openings of relatively graduated size, said members having similar lodgment each within the opening of an adjacent member.

2. In a camera of the class described sets of relatively movable light excluding devices, a light admitting member operatively connecting said sets of devices for controlling the relative positioning thereof, and means to lock said devices in any of several positions of adjustment.

3. In a camera, sets of vertically and horizontally adjustable light excluding members, a locking frame movable relative thereto, and a locking lever having a locking finger adapted for engagement with said frame to lock said frame in any of several horizontal positions of adjustment.

4. In a camera, sets of vertically and horizontally adjustable light excluding members, a locking frame movable relative thereto, a locking lever having a locking finger adapted for engagement with said frame to lock said frame in any of several horizontal positions of adjustment, and a pawl adapted for engagement with locking notches in said frame for locking the members in any of several positions of vertical adjustment.

5. In a camera, a locking frame adapted to control the relative positioning of a series of light excluding members, said frame having a locking notch in the center of one of its strips and a plurality of notches spaced equi-distant from each other in another of its strips, a locking lever pivotally mounted and having a finger adapted for engagement in said centrally disposed notch or with the side strips of the frame to control the relative horizontal adjustment of said light excluding members, and a pawl pivotally mounted and adapted for selective engagement with said spaced notches to control the relative vertical positioning of said light excluding members.

6. In a camera, a camera box having a hole in a wall thereof, a series of relatively movable devices adapted to be held in adjusted position within said box, a locking frame movable independently of said devices, and a locking lever pivoted to said camera box and comprising a lever arm having a locking finger adapted for engagement with said locking frame, an arm having a point adapted for removable engagement with the hole in the camera box, and a finger operating portion on the body of the lever.

7. In a camera, spaced sets of relatively movable members having openings of relatively graduated size, a socket piece set in said openings and operatively connecting said sets of members, a lens holder seated in said socket piece, a locking frame controlling the relative positioning of said sets of members, means carried by the attaching plate of the lens holder adapted for engagement with said locking frame to control the relative vertical adjustments of said sets of members, and a locking lever pivotally mounted for engagement with said locking frame for controlling the relative horizontal adjustments of the members.

8. In a camera, in combination with a camera box having an open side, a support for a sensitized medium in said box, a plurality of relatively movable devices for controlling the admission of light to said medium, a lens operatively associated with said devices, and a closure normally covering said open side but entirely displaceable relative thereto to uncover the full field of said devices.

9. In a camera, in combination with a camera box having an open side, a support for a sensitized medium in said box, a plurality of relatively movable devices for controlling the admission of light to said medium, a lens operatively associated with said devices, and a flexible closure normally covering said open side but entirely displaceable relative thereto by a sliding movement across the face thereof to uncover the full field of said devices.

In testimony whereof I affix my signature in presence of two witnesses.

HARVEY T. WING.

Witnesses:
 IDA S. CLEMENT,
 VICTORIA LOWDEN.